United States Patent
Song et al.

(10) Patent No.: US 11,868,251 B2
(45) Date of Patent: Jan. 9, 2024

(54) INTERLEAVED WIDEBAND MEMORY ACCESS METHOD USING OPTICAL SWITCH, AND SERVER FOR PERFORMING THE SAME

(71) Applicant: ELECTRONICS AND TELECOMMUNICATIONS RESEARCH INSTITUTE, Daejeon (KR)

(72) Inventors: Jongtae Song, Daejeon (KR); Daeub Kim, Daejeon (KR); Ji Wook Youn, Daejeon (KR); Kyeong-Eun Han, Daejeon (KR); Joon Ki Lee, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/858,187

(22) Filed: Jul. 6, 2022

(65) Prior Publication Data

US 2023/0144656 A1 May 11, 2023

(30) Foreign Application Priority Data

Nov. 9, 2021 (KR) .................. 10-2021-0153138

(51) Int. Cl.
*G06F 12/06* (2006.01)

(52) U.S. Cl.
CPC ................ *G06F 12/0607* (2013.01)

(58) Field of Classification Search
CPC .......... G06F 12/0607; G06F 12/0815; H04J 14/0254; H04L 49/9078; H04L 49/9084; H04Q 11/0001
See application file for complete search history.

(56) References Cited

U.S. PATENT DOCUMENTS 6,792,006 B1 * 9/2004 Kumaki ............ H04N 21/2368
370/537
8,050,280 B2 11/2011 Choi et al.
(Continued)

FOREIGN PATENT DOCUMENTS

JP H06-019785 A 1/1994
KR 10-2006-0062576 A 6/2006
(Continued)

OTHER PUBLICATIONS

"5G at the Edge", 5G Americas Whitepaper, Oct. 2019.
(Continued)

*Primary Examiner* — Aracelis Ruiz
(74) *Attorney, Agent, or Firm* — LRK PATENT LAW FIRM

(57) ABSTRACT

Provided are a memory access method and a server for performing the same. A memory access method performed by an optical interleaver included in a server includes receiving a request message from a requester processing engine included in the server, setting receiving buffers corresponding to different wavelengths corresponding to the number of external memory/storage devices connected to the server, multiplexing the same request message at the different wavelengths according to a wavelength division multiplexing (WDM) scheme, and transmitting the multiplexed request messages to the respective external memory/storage devices, wherein an address of a virtual memory managed by the server is separated and stored according to an interleaving scheme by a responder included in each of the external memory/storage devices.

16 Claims, 8 Drawing Sheets

(56) References Cited

U.S. PATENT DOCUMENTS

2004/0073699 A1    4/2004    Hong et al.
2014/0099118 A1*  4/2014    Zhang ................ H04J 14/0257
                                                            398/79

FOREIGN PATENT DOCUMENTS

| KR | 10-2018-0109140 A | 10/2018 |
| KR | 10-2020-0066893 A | 6/2020 |
| KR | 10-2021-0079543 A | 6/2021 |
| KR | 10-2021-0132348 A | 11/2021 |

OTHER PUBLICATIONS

Marcus Weldon, "The Future X Network: A Bell Labs Perspective", Nokia Bell Labs, 2017.

Peter X. Gao, et al, "Network Requirements for Resource Disaggregation", 12th USENIX Symposium on Operating Systems Design and Implementation, 2016.

N. Terzenidis, et al, "High-Port and Low-Latency Optical Switches for Disaggregated Data Centers: The Hipoλaos Switch Architecture [Invited]", J. Opt. Commun. Netw, 2018.

Chung-Sheng Li, et al, "Composable architecture for rack scale big data computing", Future Generation Computer Systems, 2016.

Sangjin Han, et al, "Network Support for Resource Disaggregation in Next-Generation Datacenters" ACM Workshop—Hot Topics in Networks, 2013.

Sheng Di, et al, "Characterizing Cloud Applications on a Google Data Center," in 42nd Int. Conf. on Parallel Processing (ICPP), Lyon, France, 2013, pp. 468-473.

Georgios Zervas, et al, "Disaggregated Compute, Memory and Network Systems: A New Era for Optical Data Centre Architectures", OFC 2017.

Xiaotao Guo, et al, "Performance Assessment of a Novel Rack-scale Disaggregated Data Center with Fast Optical Switch", OFC 2019.

Ziyi Zhu, et al, "Flexible Resource Allocation Using Photonic Switched Interconnects for Disaggregated System Architectures", OFC 2019.

\* cited by examiner

INTERLEAVED WIDEBAND MEMORY ACCESS METHOD USING OPTICAL SWITCH, AND SERVER FOR PERFORMING THE SAME

CROSS-REFERENCE TO RELATED APPLICATION

This application claims the benefit of Korean Patent Application No. 10-2021-0153138 filed on Nov. 9, 2021, in the Korean Intellectual Property Office, the entire disclosure of which is incorporated herein by reference for all purposes.

BACKGROUND

1. Field of the Invention

One or more example embodiments relate to a memory access method and a server for performing the same, and more particularly, to an interleaved wideband memory access technology using an optical switch.

2. Description of Related Art

With 5th generation (5G) as the starting point, cloud services are expected to become popular, and existing cloud functions are expected to gradually evolve from simple data providing services to various ultra-low-latency artificial intelligence (AI) services. A cloud computing structure is evolving from a homogeneous computing structure in which performance of a central processing unit (hereinafter, CPU) is important to heterogeneous computing in which fast data exchange between specialized engines is important. In accordance with this evolution toward the heterogeneous computing, data center networks are evolving from a structure connecting servers to a disaggregation technology connecting cloud resources such as CPU, memory, accelerator, and storage on the network.

The issue of the disaggregation technology of these computing resources is to ensure that the application performance is not degraded by accelerating the connection between resources while distributing the resources on the network. Ultimately, the purpose is to provide connection delay and bandwidth between computing resources as if they are connected in the same physical server. Even if a resource pool is connected through an electric switch, the required delay and bandwidth may be satisfied in the case of the accelerator and the storage, so performance degradation does not occur.

However, delay/bandwidth need to be guaranteed as 1 μs delay and 100 Gbps bandwidth to minimize performance degradation in the case of memory, which cannot be solved with an electric switch, so the application of an optical switch is essential. In particular, in order to support high bandwidth memory (HBM) which requires a bandwidth of several Tbps, it is expected that an optical connection will be required.

In addition, currently, utilization of the memory and the CPU of the data center is low. As a result of measuring actual utilization of the memory and the CPU of the data center, the memory/CPU utilization ratio for each server differs by up to 1000 times, a resource use imbalance is serious with 2% of applications using 98% of the resources, and the resource utilization rate of the current data center is hovering around 40%. Accordingly, there is a need for a method of resolving such resource use imbalance.

SUMMARY

Example embodiments provide a system and method for providing a broadband memory access technology by distributing memory resources of a server in a data center on a network using an interleaving scheme.

In addition, example embodiments provide access of a CPU of the server to the memory resources distributed on the network by using an optical switch, thereby minimizing a network switching delay.

According to an aspect, there is provided a memory access method performed by an optical interleaver included in a server including receiving a request message from a requester processing engine included in the server, setting receiving buffers corresponding to different wavelengths corresponding to the number of external memory/storage devices connected to the server, multiplexing the same request message at the different wavelengths according to a wavelength division multiplexing (WDM) scheme, and transmitting the multiplexed request messages to the respective external memory/storage devices, wherein an address of a virtual memory managed by the server is separated and stored according to an interleaving scheme by a responder included in each of the external memory/storage devices.

The server and the external memory/storage devices may be connected to each other through an optical switch.

The requester processing engine may be configured to exchange the request message with the responder included in each of the external memory/storage devices to perform a read operation or a write operation on a remote memory included in each of the external memory/storage devices.

The server may further include a coherence fabric configured to provide cache coherency between a local memory included in the server and a remote memory included in each of the external memory/storage devices.

The server may further include a home agent configured to support a function for cache sharing of data by configuring an address system of a remote memory included in each of the external memory/storage devices.

According to another aspect, there is provided a memory access method performed by an optical interleaver included in a server including receiving response messages from external memory/storage devices connected to the server, storing the response messages in receiving buffers distinguished according to wavelengths based on wavelengths used to transmit the response messages, and when all of the receiving buffers are filled with the response messages, transferring the response messages stored in the receiving buffers to a requester processing engine included in the server, wherein an address of a virtual memory managed by the server is separated and stored according to an interleaving scheme by a responder included in each of the external memory/storage devices.

The server and the external memory/storage devices may be connected to each other through an optical switch.

The requester processing engine may be configured to exchange a request message with the responder included in each of the external memory/storage devices to perform a read operation or a write operation on a remote memory included in each of the external memory/storage devices.

The server may further include a coherence fabric configured to provide cache coherency between a local memory included in the server and a remote memory included in each of the external memory/storage devices.

The server may further include a home agent configured to support a function for cache sharing of data by configuring an address system of a remote memory included in each of the external memory/storage devices.

According to another aspect, there is provided a server performing a memory access method including a processor, wherein the processor is configured to receive a request message from a requester processing engine included in the server, set receiving buffers corresponding to different wavelengths corresponding to the number of external memory/storage devices connected to the server, multiplex the same request message at the different wavelengths according to a wavelength division multiplexing (WDM) scheme, and transmit the multiplexed request messages to the respective external memory/storage devices, and wherein an address of a virtual memory managed by the server is separated and stored according to an interleaving scheme by a responder included in each of the external memory/storage devices.

The processor may be configured to, when response messages are received from the external memory/storage devices in response to the request message, store the received response messages in the receiving buffers distinguished according to wavelengths, and when all of the receiving buffers are filled with the response messages, transfer the response messages stored in the receiving buffers to the requester processing engine.

The server and the external memory/storage devices may be connected to each other through an optical switch.

The requester processing engine may be configured to exchange the request message with the responder included in each of the external memory/storage devices to perform a read operation or a write operation on a remote memory included in each of the external memory/storage devices.

The server may further include a coherence fabric configured to provide cache coherency between a local memory included in the server and a remote memory included in each of the external memory/storage devices.

The server may further include a home agent configured to support a function for cache sharing of data by configuring an address system of a remote memory included in each of the external memory/storage devices.

Additional aspects of example embodiments will be set forth in part in the description which follows and, in part, will be apparent from the description, or may be learned by practice of the disclosure.

According to example embodiments, it is possible to provide a broadband memory access technology by distributing memory resources of a server in a data center on a network using an interleaving scheme.

According to example embodiments, a CPU of the server may access the memory resources distributed on the network using an optical switch, thereby minimizing the network switching delay.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, embodiments of the present disclosure will be described in detail with reference to the accompanying drawings.

Figure 1:
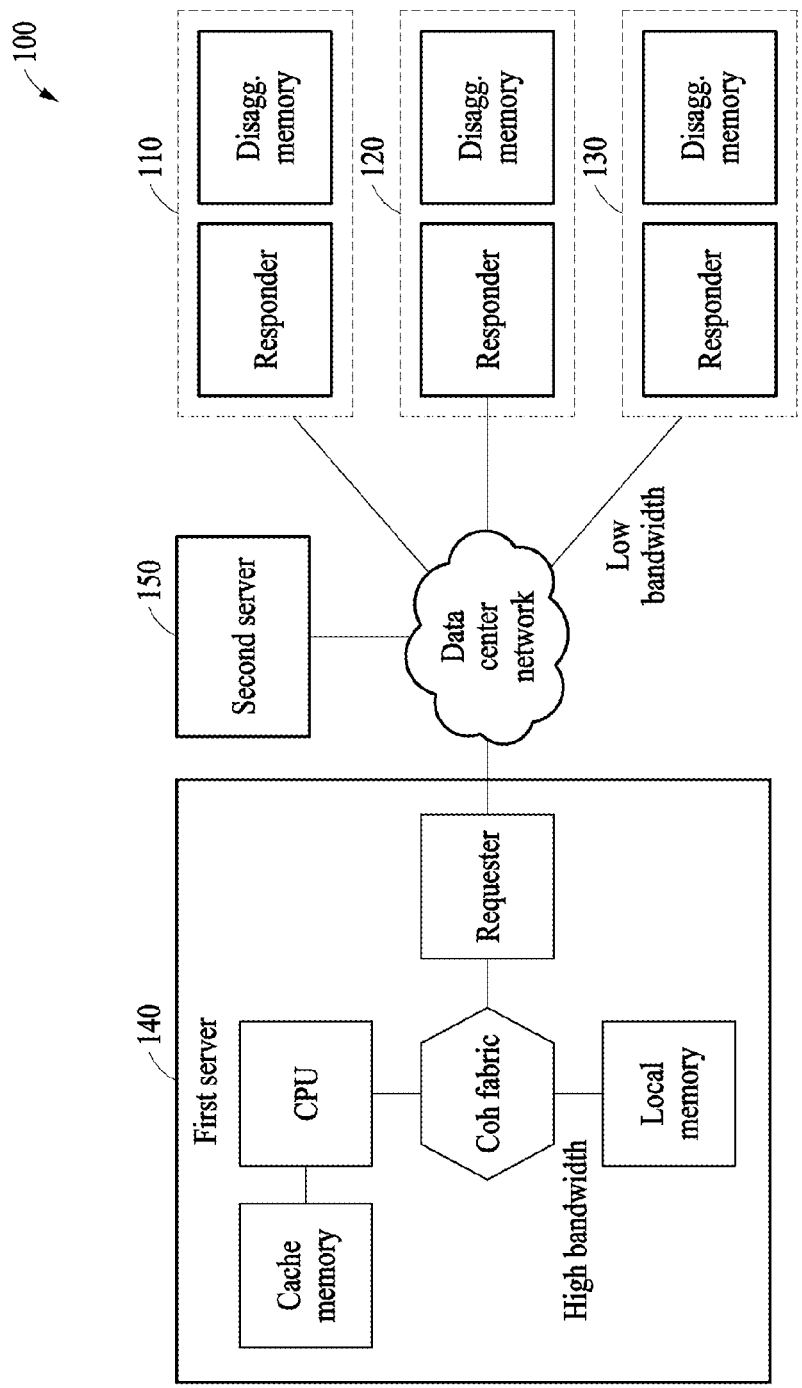
FIG. 1 is a schematic diagram illustrating a memory access system according to an example embodiment.

FIG. 1 is a schematic diagram illustrating a memory access system according to an example embodiment.

Example embodiments provide a method of solving a physical limitation of placing a memory used by a server in a data center on a memory bus in the same server. To this end, a memory access system 100 of example embodiments may provide a memory disaggregation technology for distributing external memory/storage devices 110 to 130 including remote memories on a network and sharing the external memory/storage devices 110 to 130, as shown in FIG. 1.

However, since the remote memories included in the external memory/storage devices 110 to 130 exchange large-capacity traffic in parallel at high speed, when accessing through a relatively small bandwidth through a link of the network, the same performance may not be guaranteed as the local memories included in servers 140 to 150. For example, a high bandwidth memory 2 (HBM2) provides a total of 2 Tbps of memory access bandwidth by connecting 1024 bandwidths of 2 Gbps in parallel. However, such wideband memory access is possible in the form of a highly integrated chiplet, and when switching is performed through a network, it is difficult to provide the wideband memory access through parallel connection.

According to example embodiments, to overcome this issue, local memories included in the external memory/storage devices 110 to 130 and CPUs included in the server 140 to 150 may be connected by high-speed broadband by using an optical switch.

Figure 2:
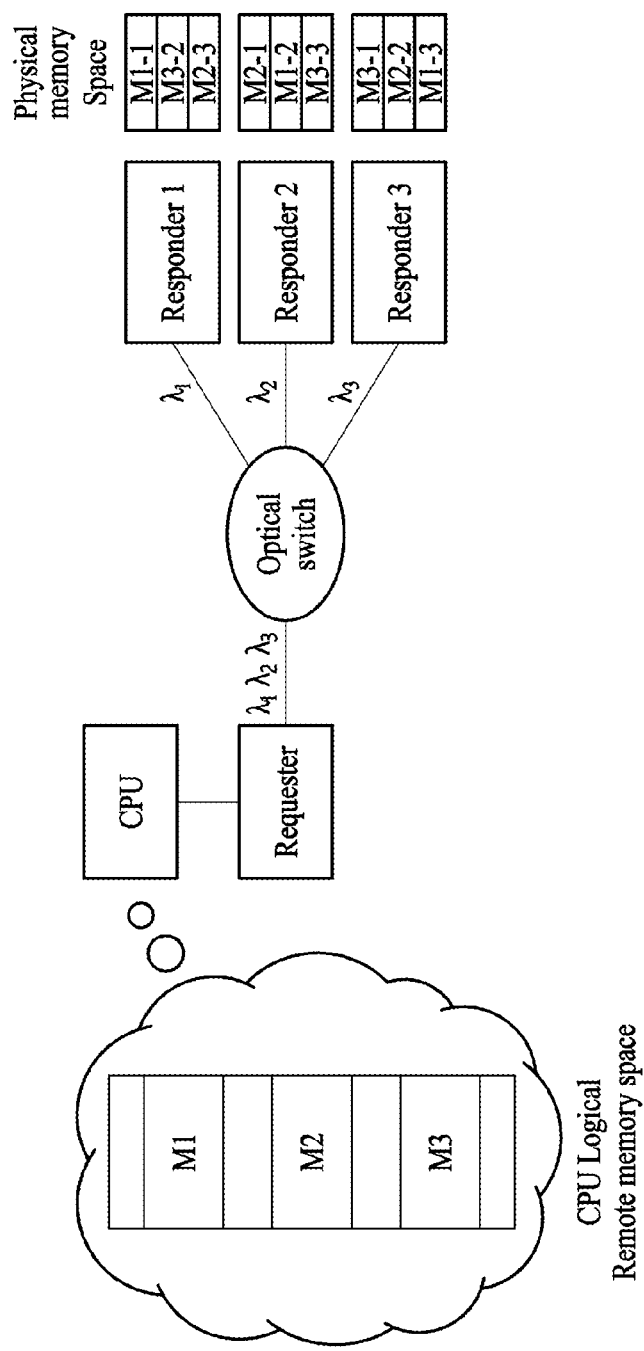
FIG. 2 is a diagram illustrating a configuration of a memory access system according to an example embodiment.

FIG. 2 is a diagram illustrating the configuration of a memory access system according to an example embodiment.

A CPU in a server may execute a specific application program, and use remote memories of external memory/storage devices that are physically separated and distributed to execute the specific application program. In this case, the remote memories included in the distributed external memory/storage devices may be recognized as consecutive addresses on a virtual address system under management of the CPU.

Physical locations of the remote memories may be distributed and stored in a plurality of external memory/storage devices. For example, referring to FIG. 2, a virtual memory M1 has consecutive addresses in the virtual address system, but is physically interleaved in the form of M1-1, M1-2, and M1-3 to be stored separately in responders (Responders 1, 2, 3) included in the external memory/storage devices, respectively.

When the specific application program performs read and write to the remote memories, the CPU in the server may recognize the remote memories as consecutive memories and request read and write. In this case, the read/write request may be transferred to the responders in the plurality of external memory/storage devices physically separated by a requester receiving the read/write request from the CPU.

The requester in the server and the responder in the external memory/storage device are physically connected through a single optical link through the network, but multiple wavelengths may be multiplexed through the WDM scheme and transferred through the single optical link.

However, a response speed of the responder may be limited according to characteristics of media as shown in FIG. 2. For example, when a current DRAM memory controller has a performance of 10 Gbps, even if a bandwidth larger than this is provided in the network, the bandwidth may not be utilized.

However, when the memories are disposed in the three responders connected in parallel in an interleaved form as shown in FIG. 2, the requester may obtain the memory access performance of 30 Gbps.

Figure 3:
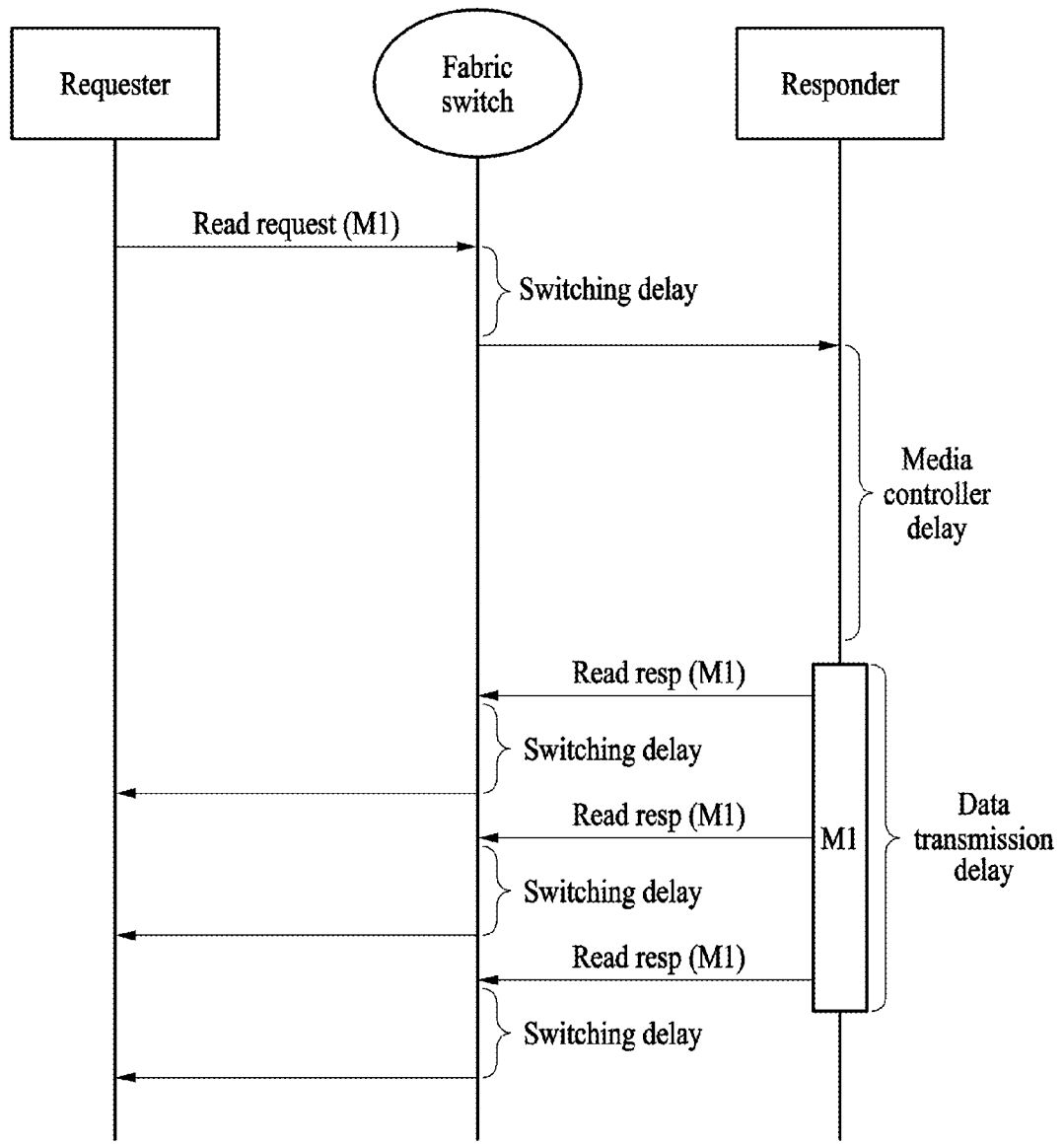
FIG. 3 is a diagram illustrating a memory access process according to a related art.

FIG. 3 is a diagram illustrating a memory access process according to a related art.

FIG. 3 illustrates a case in which a memory is read while the virtual address of the virtual memory M1 is not interleaved in the external memory/storage devices. In this case, the requester may transfer a read request for the virtual memory M1 to the responder in the external memory/storage device, and the responder may read response data from a remote memory corresponding to the virtual memory M1 through a memory controller.

The responder may transfer the response data read from the remote memory corresponding to the virtual memory M1 as described above in the form of a packet to the requester. At this time, when the size of the packet transferred to the requester is equal to or greater than the maximum packet size, the responder divides the response into multiple responses for one request and transmits the multiple responses as shown in FIG. 3.

Due to this, after the responder receives the read request from the requester, the responder experiences a media controller delay and a data transmission delay until transmission of the response data to the requester is completed.

In addition, two switching delays may be additionally generated in the case of using an electricity-based switch fabric structure when switching the read request and response data.

Figure 4:
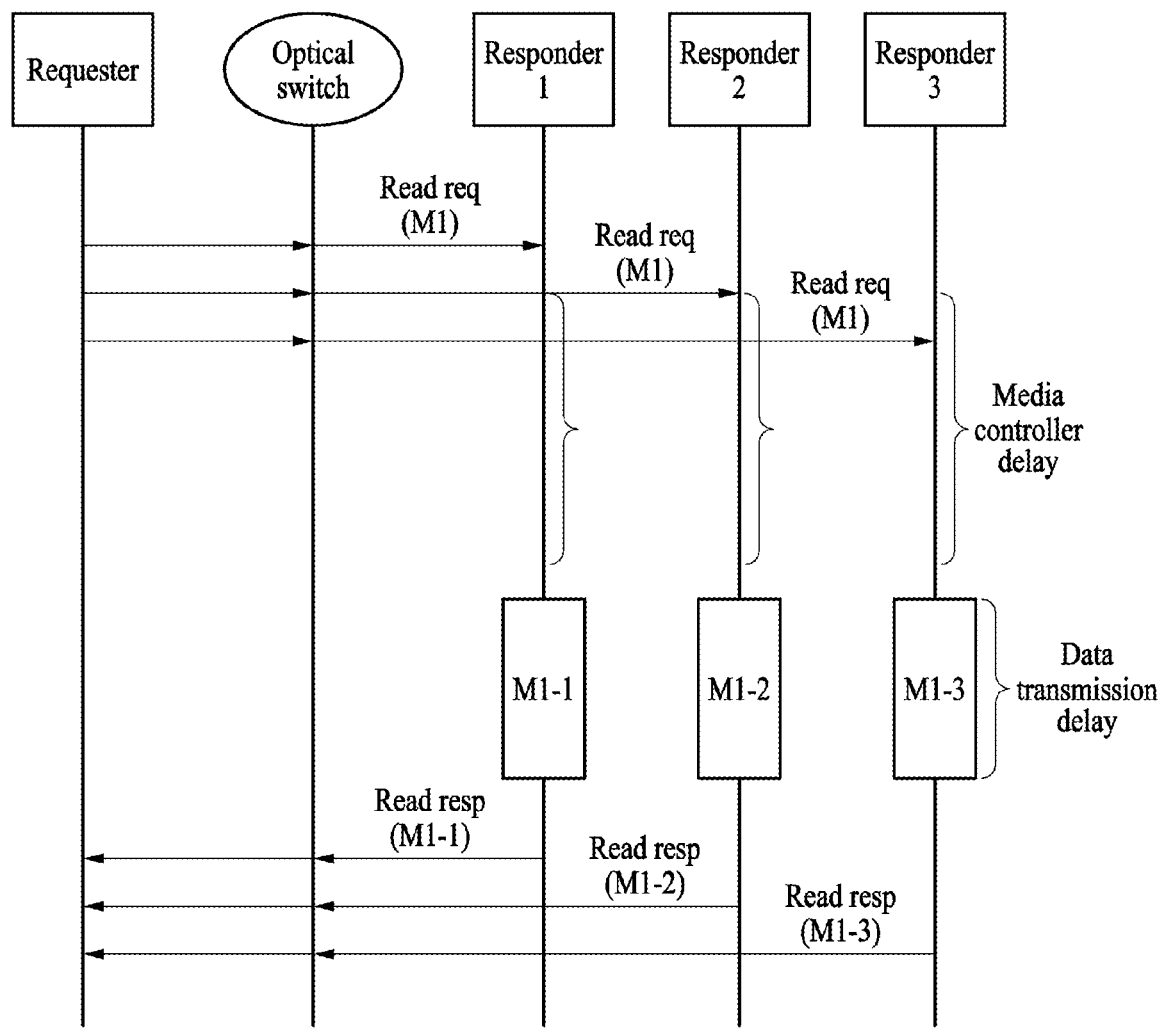
FIG. 4 is a diagram illustrating a memory access process according to an example embodiment.

FIG. 4 is a diagram illustrating a memory access process according to an example embodiment.

The memory access system of example embodiments may provide a structure in which the requester in the server simultaneously transfers the same request message to the responders in different external memory/storage devices. In the example of FIG. 4, although the number of responders is set as three (3), this is only an example and the number of responders may not be limited.

For example, the requester may multiplex three identical read request messages at different wavelengths according to the WDM scheme and transmit the multiplexed read request messages to three different responders through one optical link. In this case, the three multiplexed read request messages may arrive at different responders, respectively, for each wavelength through the optical switch.

For example, when the optical switch is arrayed waveguide grating routers (AWGR), a switching delay may not occur by using passive optical devices that switch to different paths according to wavelengths. As shown in FIG. 4, the read request for the virtual memory M1 may be transferred to different responders (Responders 1, 2, 3), and the responders may transfer information in the virtual memories M1-1, M1-2, and M1-3 simultaneously through response messages to the requester. In this case, the responder may transfer the response message to the requester using the same wavelength as the wavelength at which the read request is received.

Figure 5:
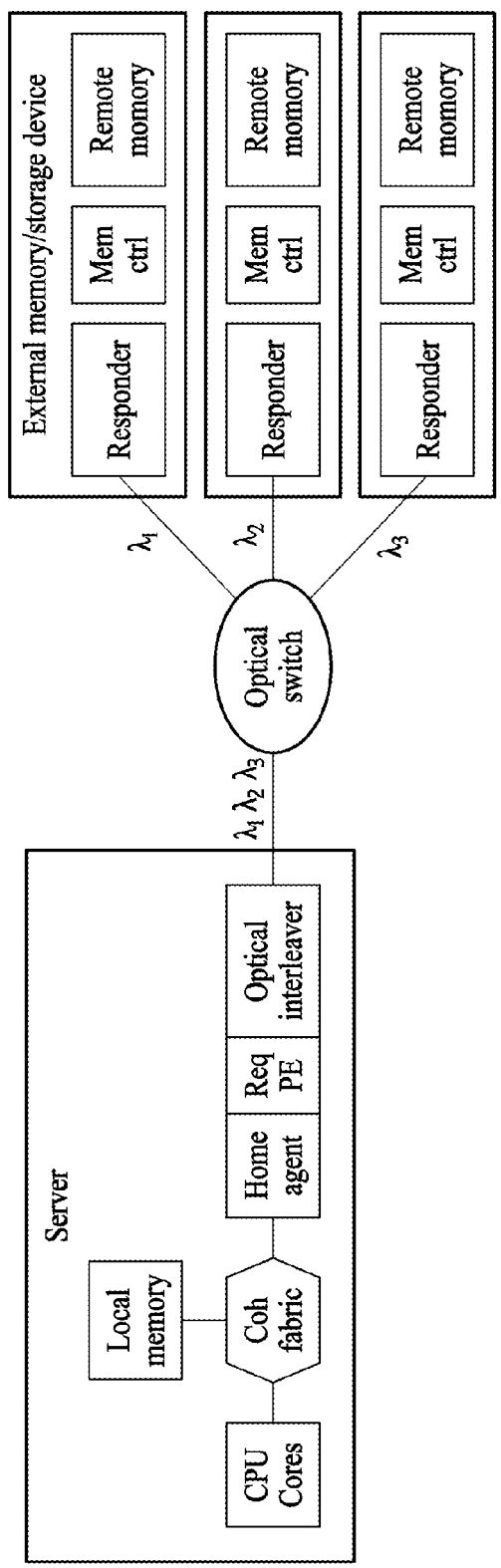
FIG. 5 is a configuration diagram illustrating a memory access system according to an example embodiment.

FIG. 5 is a configuration diagram illustrating a memory access system according to an example embodiment.

Referring to FIG. 5, one server accesses a plurality of external memory/storage devices through the WDM, and the server and each external memory/storage device may be connected through one wavelength, respectively.

More specifically, the server may include a CPU core, a local memory, a coherence fabric, a home agent, a requester processing engine, and an optical interleaver. In this case, the coherence fabric may provide cache coherency between the local memory included in the server and a remote memory included in each of the external memory/storage devices, and the home agent may provide a function for data cache sharing by configuring the remote memory included in each of the external memory/storage devices as one address system.

In addition, the requester processing engine may exchange a request message with a responder included in each of the external memory/storage devices to control a read operation or a write operation to be performed on the remote memory included in each of the external memory/storage devices, and the optical interleaver may simultaneously transmit read/write requests through the WDM scheme for communicating with the plurality of interleaved external memory/storage devices and simultaneously receive response messages. In this case, cache coherence load between a plurality of home agents may be simplified by disposing the optical interleaver under the home agent.

The external memory/storage device may receive the read/write request from the server and perform the read operation or the write operation on the remote memory corresponding to a requested memory address. More specifically, the external memory/storage device may include the responder, the memory controller, and the remote memory.

First, the responder may analyze the request message received from the server to identify the remote memory on which the read operation or the write operation is to be performed. Thereafter, the responder may perform the read operation or the write operation for the identified remote memory through the memory controller. If the read operation is performed on the remote memory, the responder may transfer data obtained through the read operation to the requester using the response message.

Figure 6:
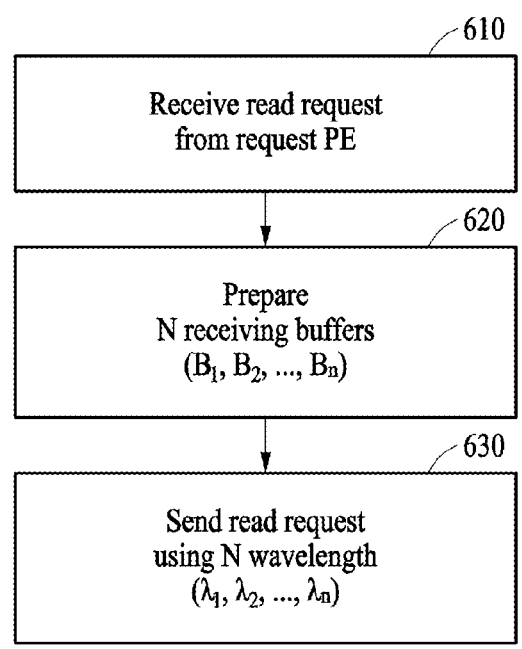
FIG. 6 is a diagram illustrating a read request transmission operation of an optical interleaver according to an example embodiment.

FIG. 6 is a diagram illustrating a read request transmission operation of an optical interleaver according to an example embodiment.

An example embodiment illustrates an operation of the optical interleaver using N wavelengths ($\lambda_1, \lambda_2, \lambda_3, \ldots, \lambda_N$). In operation 610, the optical interleaver may receive the read request from the requester processing engine included in the server.

In operation 620, the optical interleaver may set each of receiving buffers corresponding to different wavelengths in correspondence with the number of the external memory/storage devices connected to the server. For example, the optical interleaver may prepare N receiving buffers $B_1$, $B_2$, $B_3$, ..., $B_N$ as many as the number of sending wavelengths.

In operation 630, the optical interleaver may multiplex the same read request at different wavelengths according to the WDM scheme, and may transmit the read request to each of the external memory/storage devices through the optical switch.

Figure 7:
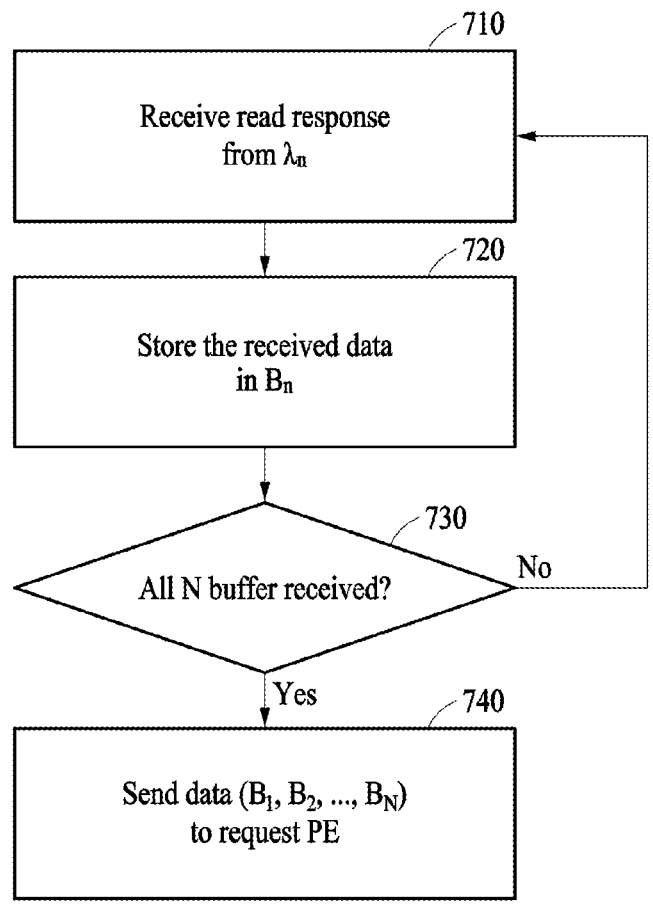
FIG. 7 is a diagram illustrating a response message reception operation of an optical interleaver according to an example embodiment.

FIG. 7 is a diagram illustrating a response message reception operation of an optical interleaver according to an example embodiment.

In operation 710, the optical interleaver may receive the response messages from the external memory/storage devices connected to the server.

In operation 720, the optical interleaver may store the response messages in the receiving buffers distinguished according to wavelengths based on wavelengths used to transmit the response messages. For example, the optical interleaver may store the response message received using the wavelength $\lambda_1$ in the receiving buffer $B_1$ set to correspond to the wavelength $\lambda_1$.

When all of the receiving buffers are filled with the response messages in operation 730, in other words, when it is determined that the N receiving buffers are filled with the response messages, the optical interleaver may transfer the response messages stored in the receiving buffers to the requester processing engine included in the server in operation 740.

Figure 8:
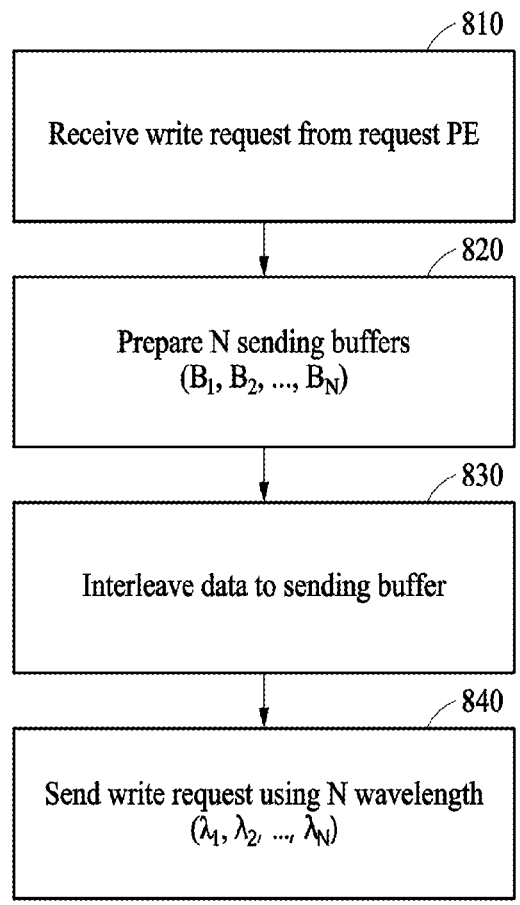
FIG. 8 is a diagram illustrating a write request transmission operation of an optical interleaver according to an example embodiment.

FIG. 8 is a diagram illustrating a write request transmission operation of an optical interleaver according to an example embodiment.

In operation 810, the optical interleaver may receive the write request from the requester processing engine included in the server.

In operation 820, the optical interleaver may set each of sending buffers corresponding to different wavelengths to correspond to the number of external memory/storage devices connected to the server. For example, the optical interleaver may prepare N sending buffers $B_1$, $B_2$, $B_3$, ..., $B_N$ as many as the number of sending wavelengths.

In operation 830, the optical interleaver may interleave data to the set sending buffers. Unlike the read request, the write request additionally requires a data buffering operation because the write request includes data to be written to the corresponding address, and the buffer is emptied after the buffered data is transmitted at a plurality of wavelengths.

Finally, in operation 840, the optical interleaver may multiplex the same write request at different wavelengths according to the WDM scheme, and may send the write request to each of the external memory/storage devices through the optical switch.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In a specific case, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A memory access method performed by an optical interleaver included in a server, comprising:
   receiving a request message from a requester processing engine included in the server;
   setting receiving buffers corresponding to different wavelengths corresponding to a number of external memory/storage devices connected to the server;
   multiplexing the same request message at the different wavelengths according to a wavelength division multiplexing (WDM) scheme; and
   transmitting the multiplexed request messages to the respective external memory/storage devices,
   wherein an address of a virtual memory managed by the server is separated and stored according to an interleaving scheme by a responder included in each of the external memory/storage devices.

2. The memory access method of claim 1, wherein the server and the external memory/storage devices are connected each other through an optical switch.

3. The memory access method of claim 1, wherein the requester processing engine is configured to exchange the request message with the responder included in each of the external memory/storage devices to perform a read operation or a write operation on a remote memory included in each of the external memory/storage devices.

4. The memory access method of claim 1, wherein the server further comprises a coherence fabric configured to provide cache coherency between a local memory included in the server and a remote memory included in each of the external memory/storage devices.

5. The memory access method of claim 1, wherein the server further comprises a home agent configured to support a function for cache sharing of data by configuring an address system of a remote memory included in each of the external memory/storage devices.

6. A memory access method performed by an optical interleaver included in a server, comprising:
   receiving response messages from external memory/storage devices connected to the server;
   storing the response messages in receiving buffers distinguished according to wavelengths based on wavelengths used to transmit the response messages; and
   when all of the receiving buffers are filled with the response messages, transferring the response messages stored in the receiving buffers to a requester processing engine included in the server,
   wherein an address of a virtual memory managed by the server is separated and stored according to an interleaving scheme by a responder included in each of the external memory/storage devices.

7. The memory access method of claim 6, wherein the server and the external memory/storage devices are connected each other through an optical switch.

8. The memory access method of claim 6, wherein the requester processing engine is configured to exchange a request message with the responder included in each of the external memory/storage devices to perform a read operation or a write operation on a remote memory included in each of the external memory/storage devices.

9. The memory access method of claim 6, wherein the server further comprises a coherence fabric configured to provide cache coherency between a local memory included in the server and a remote memory included in each of the external memory/storage devices.

10. The memory access method of claim 6, wherein the server further comprises a home agent configured to support a function for cache sharing of data by configuring an address system of a remote memory included in each of the external memory/storage devices.

11. A server for performing a memory access method, comprising:
    a processor,
    wherein the processor is configured to:
    receive a request message from a requester processing engine included in the server, set receiving buffers corresponding to different wavelengths corresponding to a number of external memory/storage devices connected to the server, multiplex the same request message at the different wavelengths according to a wavelength division multiplexing (WDM) scheme, and transmit the multiplexed request messages to the respective external memory/storage devices, and
    wherein an address of a virtual memory managed by the server is separated and stored according to an interleaving scheme by a responder included in each of the external memory/storage devices.

12. The server of claim 11, wherein the processor is configured to:
    when response messages are received from the external memory/storage devices in response to the request message, store the received response messages in the receiving buffers distinguished according to wavelengths, and when all of the receiving buffers are filled with the response messages, transfer the response messages stored in the receiving buffers to the requester processing engine.

13. The server of claim 11, wherein the server and the external memory/storage devices are connected each other through an optical switch.

14. The server of claim 11, wherein the requester processing engine is configured to exchange the request message with the responder included in each of the external memory/storage devices to perform a read operation or a write operation on a remote memory included in each of the external memory/storage devices.

15. The server of claim 11, wherein the server further comprises a coherence fabric configured to provide cache coherency between a local memory included in the server and a remote memory included in each of the external memory/storage devices.

16. The server of claim 11, wherein the server further comprises a home agent configured to support a function for cache sharing of data by configuring an address system of a remote memory included in each of the external memory/storage devices.

\* \* \* \* \*